US007761618B2

(12) United States Patent
Avraham et al.

(10) Patent No.: US 7,761,618 B2
(45) Date of Patent: Jul. 20, 2010

(54) USING A USB HOST CONTROLLER SECURITY EXTENSION FOR CONTROLLING CHANGES IN AND AUDITING USB TOPOLOGY

(75) Inventors: Idan Avraham, Seattle, WA (US);
Kenneth D. Ray, Seattle, WA (US);
Mark Williams, Kirkland, WA (US);
David R. Wooten, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1180 days.

(21) Appl. No.: 11/090,582

(22) Filed: Mar. 25, 2005

(65) Prior Publication Data

US 2006/0218320 A1 Sep. 28, 2006

(51) Int. Cl.
*G06F 5/00* (2006.01)
*G06F 12/14* (2006.01)
(52) U.S. Cl. .................................... 710/36; 713/189
(58) Field of Classification Search ............... 710/33, 710/36; 713/189
See application file for complete search history.

(56) References Cited

U.S. PATENT DOCUMENTS 5,748,888 A * 5/1998 Angelo et al. ................ 726/26
7,213,096 B2 5/2007 Keys et al
7,290,072 B2 10/2007 Quraishi et al.
2002/0143921 A1* 10/2002 Stephan ....................... 709/223
2004/0003262 A1* 1/2004 England et al. .............. 713/189
2004/0250087 A1 12/2004 Ray et al. .................... 713/189
2006/0075259 A1 4/2006 Bajikar et al.

OTHER PUBLICATIONS

In the United States Patent and Trademark Office, in re.: U.S. Appl. No. 11/090,547 filed Mar. 25, 2005, Final Office Action dated Nov. 24, 2009, 9 pages.
In the United States Patent and Trademark Office, in re.: U.S. Appl. No. 11/090,547 filed Mar. 25, 2005, Non-Final Office Action dated May 14, 2009, 8 pages.
In the United States Patent and Trademark Office, in re.: U.S. Appl. No. 11/090,547 filed Mar. 25, 2005, Non-Final Office Action dated Sep. 30, 2008, 6 pages.

* cited by examiner

*Primary Examiner*—Henry W. H. Tsai
*Assistant Examiner*—Hyun Nam
(74) *Attorney, Agent, or Firm*—Woodcock Washburn LLP (57) ABSTRACT

Protecting computer systems from attacks that attempt to change USB topology and for ensuring that the system's information regarding USB topology is accurate is disclosed. A software model is defined that, together with secure USB hardware, provides an ability to define policies using which USB traffic can be properly monitored and controlled. The implemented policy provides control over USB commands through a combination of software evaluation and hardware programming. Legitimate commands are evaluated and "allowed" to be sent to a USB device by a host controller. Illegitimate commands are evaluated and blocked. Additionally, the USB topology is audited to verify that the system's topology map matches the actual USB topology.

15 Claims, 7 Drawing Sheets

USING A USB HOST CONTROLLER SECURITY EXTENSION FOR CONTROLLING CHANGES IN AND AUDITING USB TOPOLOGY

RELATED APPLICATIONS

This application is related to U.S. patent application Ser. No. 11/090,547, entitled "Accessing a USB Host Controller Security Extension Using a HCD Proxy" filed herewith and incorporated by reference in its entirety.

FIELD OF THE INVENTION

The invention generally relates to the field of the universal serial bus (USB) and specifically to the security of data associated with the USB.

BACKGROUND OF THE INVENTION

The manner in which USB peripherals are attached to a USB Host Controller and the manner in which USB drivers communicate with their corresponding devices make it difficult to prevent malicious software from mounting different classes of attacks that attempt to modify the USB topology. Such attacks may take various forms such as, for example, substitution attacks and snooping attacks.

A substitution attack involves substituting an illegitimate USB device for a legitimate device without the system recognizing that a substitution occurred. Each USB device is attached to a port on either a root hub or an external hub. A hub driver controls the state of its hub ports by sending certain USB commands over the hub's default pipe (endpoint 0). A malicious driver may hide a programmable USB device attached to one of the hub ports by disabling the port to which the device is connected. The driver then may be able to disable a port of a real keyboard that is attached to the same hub and enable the port of the programmable device. In addition, the malicious driver may set the USB address of its programmable device to the address that was assigned to the keyboard it disabled. The end result is that the real keyboard is spoofed by a programmable device, and the driver for the keyboard is not aware that it is talking to a different device. In sum, the system believes that input data is generated by the keyboard when the data is generated programmatically by an adversary.

Another type of attack, the snooping attack, attempts to modify USB topology by taking advantage of a process in which a device driver reads data from its device by sending it an appropriate USB command. Some data sent by a device ideally should not be read by any entity besides the applicable device driver. An example of such case is when the device has to exchange an encryption key with the driver so that the driver can use the key for decrypting data that the device is going to generate later. An adversary may obtain sensitive data by either sending an appropriate command to the device or by mounting an attack in which the adversary grabs data en route to the requesting device driver. Additionally, it is recognized that a software solution may make it more difficult for an attacker to obtain sensitive information, but software alone likely cannot provide full protection against such attacks.

Additionally, in a computer system with a USB Host Controller and USB peripherals connected to it, it is desirable for software to be able to obtain information regarding USB topology. It is currently possible for legitimate system software to obtain such information. Malicious software, however, may tamper with topology information such that legitimate software may not be able to verify that topology information it receives appropriately reflects actual USB topology. For example, an adversary may program a USB device so that it looks to the system like a different device, such as a keyboard. Because the system may need to secure certain USB input devices in order to establish a trusted path with a user, mounting this attack leads the system to "trust" a keyboard device even though it is not a really a keyboard. A malicious driver mounts the attack by sending a USB command that configures a physical programmable device. The host controller driver queries the device for its USB descriptors, and the device returns descriptors indicating that the device is a keyboard. Thus, the system loads a keyboard driver for controlling that device.

This driver then waits for input data to be generated by the device. At that point, the malicious driver can trigger the device to generate one or more keystrokes by sending an appropriate USB command to the device. When these keystrokes are generated, the keyboard driver sends the corresponding keyboard events to the operating system. The end result is that the malicious driver can inject input events into the system. This also provides the malicious driver with the ability to have the device "playback" a certain keystroke sequence at a specific time, which may create general problems and may even enable the driver to inject input into a trusted input path as if the input was generated by a trusted device.

There is a need, therefore, for systems and methods to prevent attacks on USB systems that attempt to change USB topology and to audit USB topology to ensure that the information that the system maintains regarding the attached USB devices appropriately reflects the actual USB topology. The systems and methods ideally should not be based solely in software.

SUMMARY OF THE INVENTION

The invention provides systems and methods for protecting computer systems from attacks that attempt to change USB topology and for ensuring that the system's information regarding USB topology is accurate. The invention includes defining a software model that, together with secure USB hardware, provides an ability to define policies using which USB traffic can be properly monitored and controlled. The implemented policy provides control over USB commands through a combination of software evaluation and hardware programming. Legitimate commands are evaluated and "allowed" to be sent to a USB device through the host controller. Illegitimate commands are evaluated and blocked.

The invention may be implemented to control USB topology changes. Because most topology changes involve a USB setup command sent to a relevant USB hub, trusted software may monitor such commands so that the status of USB devices connected downstream from the hub is accurate. According to the invention, data associated with a USB device, such as a setup command, is received by trusted software, and a determination is made regarding whether the data is allowed to be sent to the targeted USB device. If the data is allowed, then an instruction is sent to a host controller driver to send the data. Additionally, the trusted software may program a security extension residing on a host controller chipset to allow the data through to the USB topology and device. If the data is not allowed, then the trusted software may program the security extension to block the data from going through.

The invention includes auditing the USB topology to verify that the system's topology map matches the actual USB topology. The invention defines a model in which software and hardware are used together in order to perform the USB topology audit in a trustworthy fashion. Auditing the USB topology is valuable when certain USB devices need to be differentiated from other devices. For example, input devices may be differentiated from other USB devices because a user may generate secure input. The differentiation may provide for the establishment of a trusted input path between the user and the system application receiving the user input. The USB topology audit provides an ability to detect input devices residing in the topology in a trustworthy fashion and protects against security attacks to the system through the USB topology.

The USB audit includes receiving a USB topology map from a USB host controller driver. The map, generated by untrusted software, is verified by trusted software through a series of commands sent to the USB topology through the host controller chipset. The devices provide identifying information that is compared against the map. The identifying information received from the devices is diverted to a secure buffer in the security extension hardware and therefore trusted software is guaranteed to receive device data that hasn't been tampered with by malicious software. Before sending the aforementioned commands to the devices, the trusted software resumes all ports of the hubs in the topology in order to make sure that malicious software has not hidden a device by suspending the hub port to which the device is connected. Once the identifying information is received and scrutinized, trusted software compares the number of active hub ports with the number of devices and makes sure they are equal and that there are no hidden devices in the topology. The audit also includes identifying and securing input devices such that information generated by the input devices is diverted through a secure buffer in the security extension for evaluation within a trusted execution environment in the system.

BRIEF DESCRIPTION OF THE DRAWINGS

The foregoing summary and the following detailed description of the invention are better understood when read in conjunction with the appended drawings. Embodiments of the invention are shown in the drawings, however, it is understood that the invention is not limited to the specific methods and instrumentalities depicted therein. In the drawings.

DETAILED DESCRIPTION OF ILLUSTRATIVE EMBODIMENTS

Figure 1:
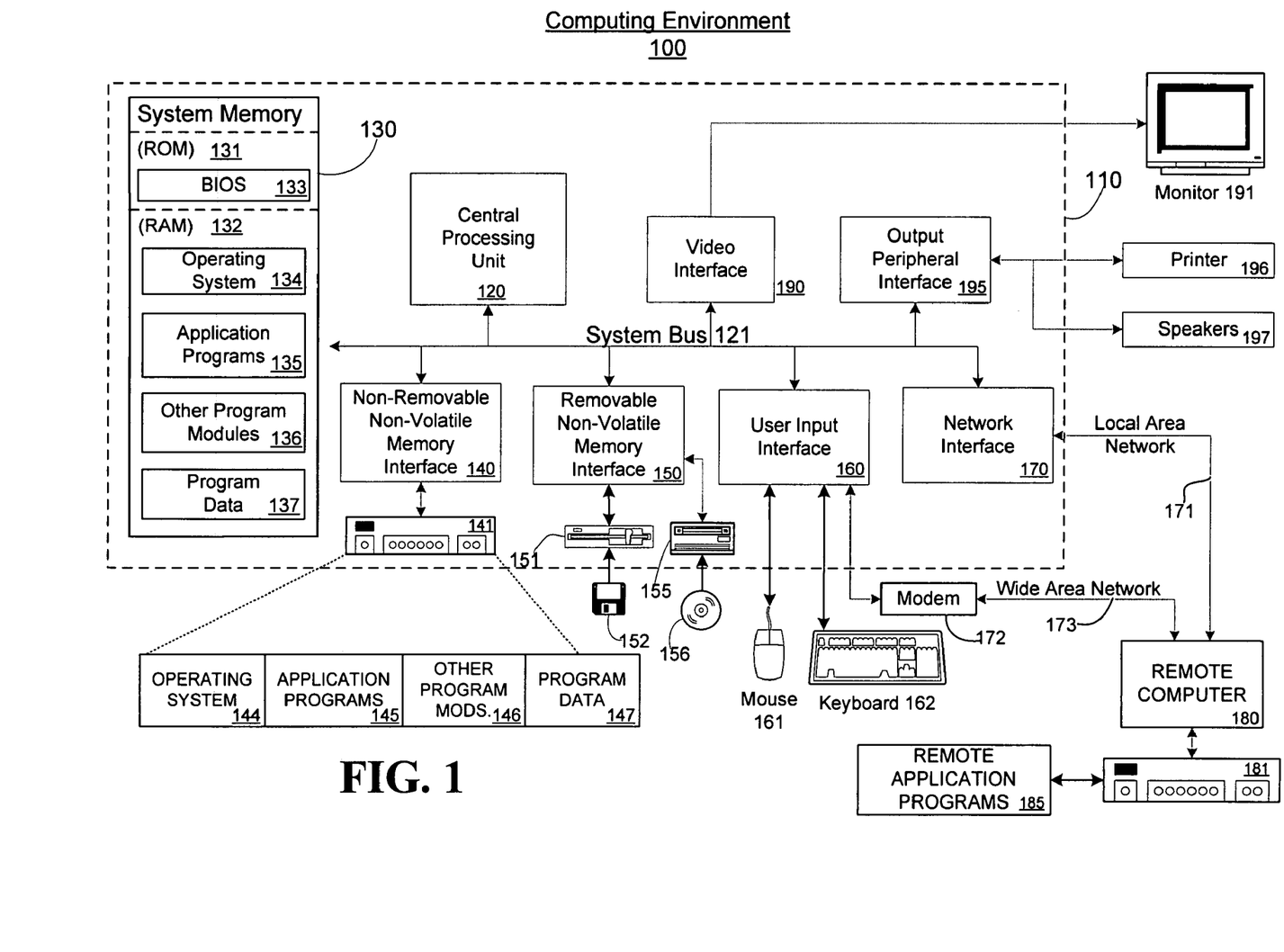
FIG. 1 is a block diagram showing an example computing environment in which aspects of the invention may be implemented.

FIG. 1 and the following discussion are intended to provide a brief general description of a suitable computing environment 100 in which an example embodiment of the invention may be implemented. As used herein, the terms "computing system," "computer system," and "computer" refer to any machine, system or device that comprises a processor capable of executing or otherwise processing program code and/or data. Examples of computing systems include, without any intended limitation, personal computers (PCs), minicomputers, mainframe computers, thin clients, network PCs, servers, workstations, laptop computers, hand-held computers, programmable consumer electronics, multimedia consoles, game consoles, satellite receivers, set-top boxes, automated teller machines, arcade games, mobile telephones, personal digital assistants (PDAs) and any other processor-based system or machine. The term "data" refers to any information of any form, including commands, transfers, or requests. The terms "program code" and "code" refer to any set of instructions that are executed or otherwise processed by a processor. The term "untrusted program code" or "untrusted code" refers to any set of instructions that are executed or otherwise processed by a processor outside of a trusted execution environment. The term "device driver" refers to any program code that at least in part controls a component of a computer system, such as a USB device, or facilitates communication of data between a component and other devices or program code of a computer system. The term "trusted execution environment" refers to an environment comprising trusted program code that is isolated from other code located outside of the trusted execution environment and to which security policies are applied to provide secure execution of the program code.

The term "universal serial bus" or "USB" refers to a cable bus that supports data exchange between a host computer and a wide range of accessible peripheral devices or functions. "USB device," "USB function," "USB peripheral" or "peripheral" refers to devices that may be attached or that are attached to a USB. USB devices, functions, or peripherals share USB bandwidth through a host-scheduled, token-based protocol. The USB allows peripherals to be attached, configured, used, and detached while the host and other peripherals are in operation.

While a general purpose computer is described below, this is merely one example. The present invention also may be operable on a thin client having network server interoperability and interaction. Thus, an example embodiment of the invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer or tester, and/or included within the network browsing software which will be described in the general context of computer-executable instructions, such as program modules, being executed by one or more computers (e.g., client workstations, servers, or other devices). Generally, program modules include routines, programs, objects, components, data structures and the like that perform particular tasks or implement particular abstract data types. Typically, the functionality of the program modules may be combined or distributed as desired in various embodiments. An embodiment of the invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 illustrates an example of a suitable computing system environment 100 in which the invention may be implemented, although as made clear above, the computing system environment 100 is only one example of a suitable computing environment and is not intended to suggest any limitation as to the scope of use or functionality of the invention. Nor should the computing environment 100 be interpreted as having any dependency or requirement relating to any one or combination of components illustrated in the exemplary operating environment 100.

With reference to FIG. 1, an example system for implementing the invention includes a general purpose computing device in the form of a computer 110. Components of computer 110 may include, but are not limited to, a central processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read-only memory (ROM), Electrically-Erasable Programmable Read-Only Memory (EEPROM), flash memory or other memory technology, compact disc read-only memory (CDROM), digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above are also included within the scope of computer readable media.

The system memory 130 includes computer storage media in the form of volatile and/or nonvolatile memory such as ROM 131 and RAM 132. A basic input/output system 133 (BIOS) containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137. RAM 132 may contain other data and/or program modules.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

A computer 110 or other client device can be deployed as part of a computer network. In this regard, the present invention pertains to any computer system having any number of memory or storage units, and any number of applications and processes occurring across any number of storage units or volumes. An embodiment of the present invention may apply to an environment with server computers and client computers deployed in a network environment, having remote or local storage. The present invention may also apply to a standalone computing device, having programming language functionality, interpretation and execution capabilities.

Example Embodiments

Figure 2:
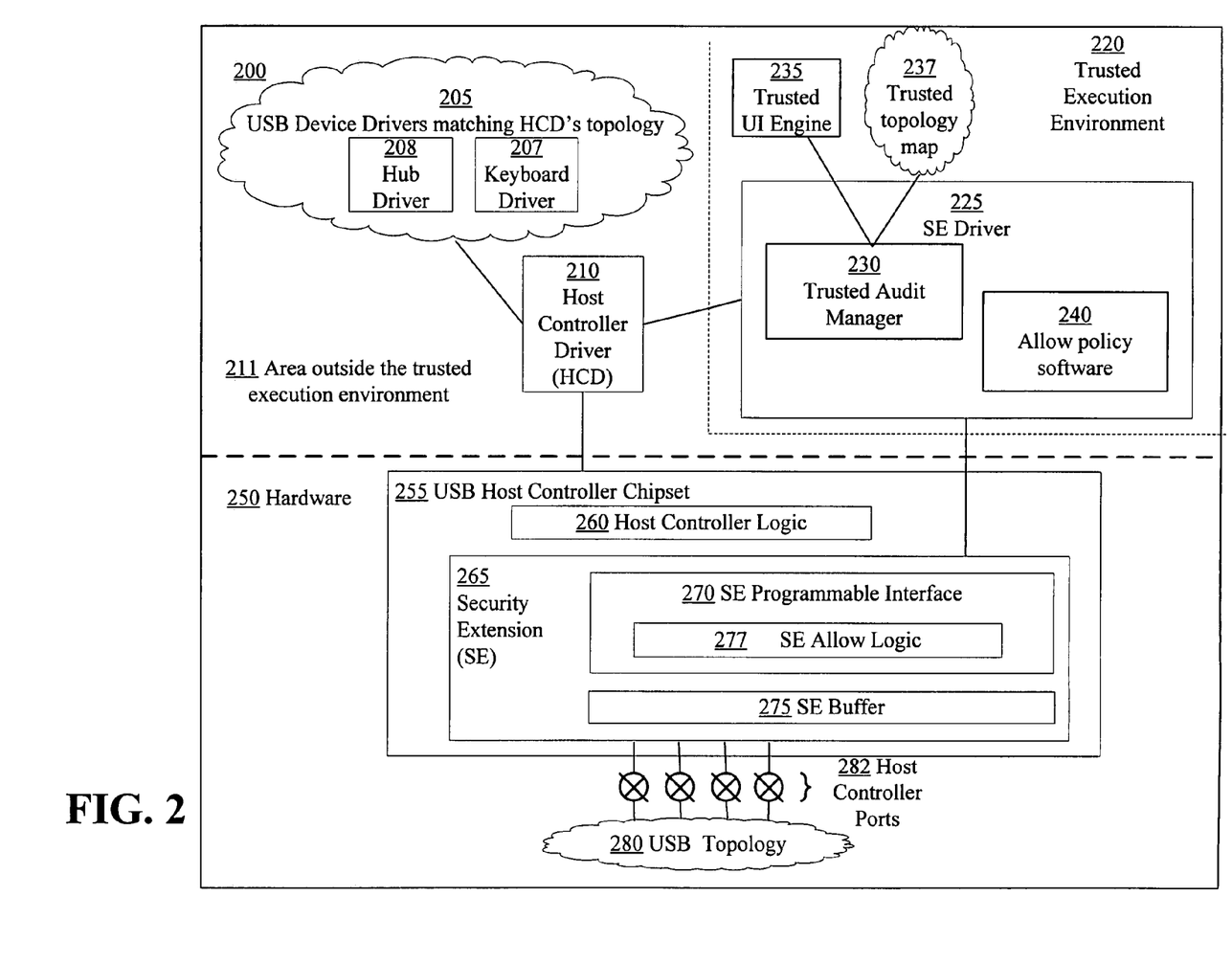
FIG. 2 is block diagram of an example system for using a USB host controller security extension for controlling changes in and auditing USB topology according to the invention.

FIG. 2 is block diagram of an example system 200 for using a USB host controller security extension for controlling changes in and auditing USB topology, according to the invention. The system 200 may be the computer 110 of FIG. 1 and may generally be divided into USB related hardware 250, a trusted execution environment 220, and an area outside of the trusted execution environment 211.

The hardware 250 includes a USB host controller chipset 255 with a hardware security extension (SE) 265, and a USB topology 280. The USB host controller chipset 255 is a hardware component to which USB devices are or may be attached. The USB host controller chipset 255 includes several ports 282 that are referred to as root ports or root hub ports. USB related data sent from, for example, a USB device driver to an associated USB device in the USB topology 280 is delivered by the USB host controller chipset 255. Likewise data sent from a USB device in the USB topology 280 to its device driver is delivered by or via the USB host controller chipset 255.

The USB topology 280 includes USB devices that are connected downstream from the USB host controller chipset 255. The USB topology 280 may also be referred to as a bus topology. The USB topology 280 contains two types of USB devices, USB hubs and USB functions. USB hubs are devices that have ports to which either hubs or functions may be connected. A USB function is a device that provides certain functionality, such as a web camera or a printer. The USB topology 280 is rooted at the ports 282 on the USB host controller chipset 255. The ports 282 are grouped together and are generally referred to as a root hub.

The SE 265 is a hardware device located on the USB host controller chipset 255 or between the USB host controller chipset 255 and the USB topology 280. The SE 265 monitors the communication traffic between devices in the USB topology 280 and the USB host controller chipset 255. The host controller chipset 255 may not be aware of the existence of the SE 265 and therefore, the SE 265 may block USB packets that the USB host controller chipset 255 sends to USB devices in the USB topology 280 as well as block or divert data that a USB device sends to the USB host controller chipset 255.

The SE 265 may include an SE buffer 275, which is a memory region to which data coming from a USB device in the USB topology 280 can be diverted. Because the SE buffer 275 may only be accessible by trusted software executing in the trusted execution environment 220, software running outside of the trusted execution environment 220 may not be able to access USB data diverted to the SE buffer 275. Also, software running outside the trusted execution environment 220 may not be able to insert USB data into the SE buffer 275 to deceive the system into believing that data was actually generated by a trusted input device.

The SE 265 additionally may include an SE programmable interface 270. Trusted software thus may be able to control the operation of the SE 265 through the programmable interface 270. Trusted software may instruct the SE 265 to dispose of data sent from or to the USB topology 280 in a particular manner. For example, trusted software may instruct the SE 265 through the SE programmable interface 270 to copy contents of a data phase of a command to the SE buffer 275 when the command is sent to a particular device address. Thus the trusted software may be able to read a device's USB descriptor and be certain that data has not been, for example, tampered with, snooped, or spoofed.

The SE programmable interface 270 includes SE allow logic 277. The SE allow logic 277 is a subset of the SE programming interface using which trusted software can control the hardware behavior with regard to an allow policy. The allow policy dictates which USB commands are and are not "allowed" to be sent through the SE 265. In this way, trusted software can use the SE allow logic 277 to adjust behavior based on certain rules described herein.

The area outside of the trusted execution environment 211 may generally include software for controlling and communicating with the USB-related hardware 250. The area outside of the trusted execution environment 211 may include a host controller driver (HCD) 210 and USB device drivers 205. The HCD 210 is a software module responsible for interfacing with the USB host controller chipset 255. The HCD 210 communicates with the USB host controller chipset 255 through a hardware interface exposed by the USB host controller chipset 255. The HCD 210 also exposes an interface that the drivers 205 running on the system 200 can utilize for communicating with their corresponding devices.

Each of the USB devices in the USB topology 280 typically is controlled by program code executed on the system 200. The program code may be grouped into software modules, and each software module may control a USB device. The software modules are the USB device drivers 205. Different USB devices are controlled by different USB device drivers. For example, a hub driver 208 is a software module controlling a USB hub. A keyboard driver 207 is a software module controlling a keyboard. For the most part, these drivers are loaded such that the driver hierarchy matches the USB topology 280. Therefore, as USB devices are added to or removed, the appropriate drivers are loaded onto the system 200 or unloaded from the system 200.

The trusted execution environment 220 may be isolated from the area outside of the trusted execution environment 211 for security related reasons. Security policies are implemented or applied to program code, memory, and any other entities within the trusted execution environment 220 to ensure that it remains isolated and secure. The isolation of software running in the trusted execution environment 220 is performed using processor support so that the trusted execution environment is protected from software attacks. Software running in the trusted execution environment 220 is generally referred to as trusted software.

One piece of trusted software within the trusted execution environment 220 is the SE driver 225. The SE Driver 225 is a software module for controlling the SE 265. The SE driver 225 runs in the trusted execution environment 220 and therefore has access to the SE programmable interface 270. The SE driver 225 in the trusted execution environment 220 obtains information about the USB topology 280 and USB traffic generated by the USB device drivers 205.

The SE driver 225 includes a trusted audit manager 230 and allow policy software 240. The trusted audit manager 230 is a software module that implements an audit of the USB topology 280. Because the trusted audit manager 230 runs in the trusted execution environment 220, it has access to the SE 265. The trusted audit manager 230 interacts with other components when auditing the USB topology 280, including the HCD 210 and a trusted UI engine 235. The trusted UI engine 235 is a module within the trusted execution environment 220 responsible for displaying UI in the trusted execution environment 220. UI elements displayed by the trusted UI engine 235 are protected from tampering by an adversary and are generally combined with the system's trusted input elements when establishing a trusted path.

Along with the trusted audit manager 230, the SE driver 225 additionally includes the allow policy software 240. The allow policy software 240 is a module that utilizes the SE allow logic 277 programmable interface. This software module runs in the trusted execution environment 220 and therefore has access to the SE 265. The HCD 210 interacts with the allow policy software 240 before sending any USB commands because the SE allow logic 277 may be programmed such that specific commands are blocked unless "allowed" to go through by the allow policy software 240.

The trusted execution environment 220 additionally may include a trusted topology map 237. The purpose of the trusted audit manager 230 is to verify that a topology map obtained from the HCD 210 matches the actual USB topology 280. The trusted topology map 237 is an "audited" topology; that is, it is the topology that the trusted audit manager 230 ends up with once the audit process is completed successfully. Therefore, the trusted topology map 237 matches the actual USB topology 280.

Figure 3:
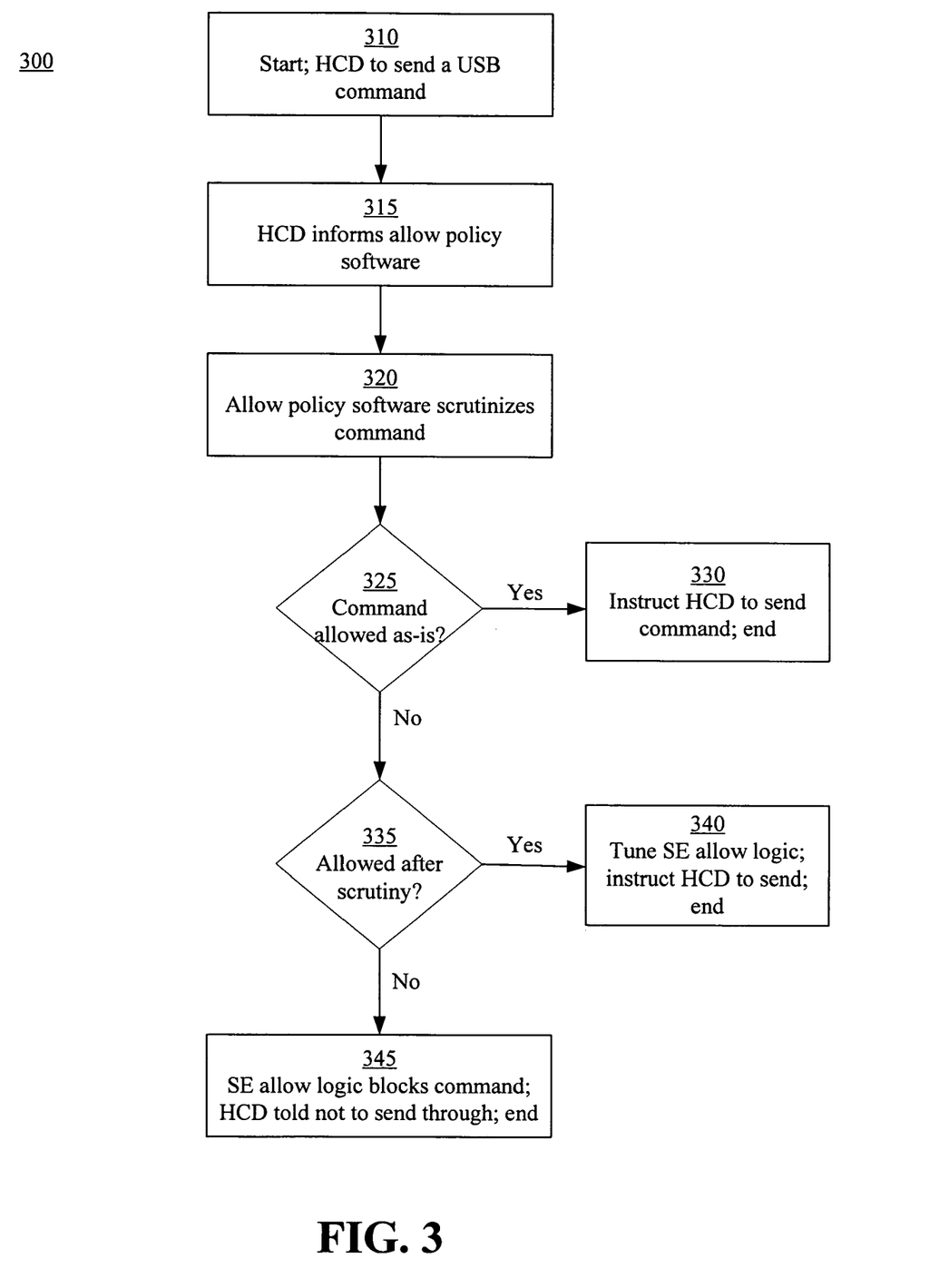
FIG. 3 is a flow diagram of an example method for controlling delivery of USB commands to USB devices according to the invention.

FIG. 3 is a flow diagram of an example method 300 for controlling delivery of USB commands to USB devices according to the invention. At step 310, the HCD 210 may prepare to send a command to a USB device in the USB topology 280. Because neither the host controller 260 nor the HCD 210 has control over the SE allow logic 277, the HCD 210 does not know whether the USB command it is about to send will be blocked by the SE 265. Therefore, at step 315, the HCD 210 informs the allow policy software 240 of the command about to be sent. At step 320, the allow policy software 240 scrutinizes the command to decide whether to allow the command to be sent. If at step 325, the allow policy software 240 concludes that the command can go through to the applicable device in the USB topology 280 without programming the SE 265 to "allow" the command, then the allow policy software 240, at step 330, instructs the HCD 210 to send the command.

If at step 325, the allow policy software 240 determines that the SE allow logic 277 should be programmed to allow the command to go through, then at step 335, the allow policy software 240 determines if the command is allowed under the circumstances and consistent with a predetermined security policy. If the command is allowed to be sent to the device, then at step 340, the allow policy software 240 tunes the settings of the SE allow logic 277 so that the command can go through and instructs the HCD 210 to send the command. For example, the SE allow logic 277 can be programmed such that a Set_Address command going to device address 0 (which is the default address) on the host controller port number 3 can go through. If at step 335, the allow policy software 240 determines that the command is not allowed through to the device, then the SE allow logic 277 is programmed to block the command and the HCD 210 is instructed not to send the command.

It is understood that it is possible for malicious software to obtain data transferred between the allow policy software 240 and the HCD 210 in the area outside the trusted execution environment 211. An adversary could cause the HCD 210 to perform an operation that is different than the instructions of the allow policy software 240. For example, when the allow policy software 240 instructs the HCD 210 that a certain command cannot be sent to the device, malicious software can cause the HCD 210 to send the command anyway. Because the allow policy software 240 has already programmed the SE allow logic 277 to block the command, however, the hardware will prevent the command from being sent.

Substitution attacks can be mitigated if the USB topology 282 remains accurate. As described herein, a substitution attack involves substituting an illegitimate USB device for a legitimate device without the system recognizing that a substitution occurred. Keeping track of the USB topology 280 by interacting with the HCD 260 alone may not ensure trustworthiness because a malicious driver can interfere with this interaction. Using a system with an SE 265 and a trusted execution environment 220 makes it possible to maintain a topology map that matches the physical bus topology 280.

To properly track changes to the USB topology 280, the SE allow logic 277 may be programmed by the trusted software such as the SE driver 225 or the allow policy software 240 contained in the SE driver 225. This may ensure that certain rules are enforced by the SE 265. One such rule is that any USB command sent to the default address must go through the allow policy software 240 so that the hardware of the SE allow logic 277 can be programmed to "allow" the command to go through. A second rule is that a USB command sent to a hub in the USB topology 280 goes through the allow policy software 240 so that the SE allow logic 277 can be programmed to "allow" the command to go through. By applying these and any other appropriate rules, USB commands that might have an impact on the USB topology 280 are evaluated and "allowed" by the allow policy software 240.

The allow policy software 240, therefore, infers a state of the actual USB topology 280 by monitoring the relevant USB commands. In this way, the allow policy software 240 will know when there has been a physical change (i.e., when a USB device is either plugged in or out of a port) to the USB topology 280.

The allow policy software 240 monitors and detects topology changes differently, depending on the type of change. For example, in one embodiment of the invention, a USB device may be attached to an external hub port. When this happens, the allow policy software 240 may look at a "Port_Reset" or similar command that the hub driver 206 sends to the hub device in the USB topology 280. Later on, when the allow policy software 240 sees a command sent to the default address (address 0), it knows that the device at the default address is connected to the hub that previously reset its port.

In an alternative embodiment of the invention, a USB device may be detached from an external hub port. The allow policy software 240 may not immediately detect this, as the hub driver 208 may not send any USB commands to its hub when it detects that a device was disconnected. When a USB command that queries the port's status, however, is sent to the hub, the allow policy software 240 can detect that the status of one of the ports changed, and it can therefore infer that whatever was connected to that port before is gone.

In yet another embodiment, a device may be attached to a root hub port. The allow policy software 240 will evaluate a USB command sent to the default address (address 0). At that point, the host controller chipset 255 is queried for its root ports' status. If one of the ports was reset, this means that the newly attached device is connected to that port. It is understood that the allow policy software 240 queries the host controller chipset 255 using the SE programmable interface 270, so the operation is trustworthy.

Likewise, when detaching a device from a root hub port, the allow policy software 240 may not immediately detect the change until a device is connected to that port, in which case the steps outlined with regard to attaching a device to the root hub are performed.

Because the USB topology 280 is dynamic, the allow policy software 240 may reprogram the SE allow logic 277 when changes in the USB topology 280 require the settings to change. This generally happens when hubs are added to or removed from the USB topology 280. The SE allow logic 277 is updated with the hub addresses so that when a USB command is sent to a hub, it is blocked by the SE allow logic 277 unless it was previously "allowed."

Figure 4:
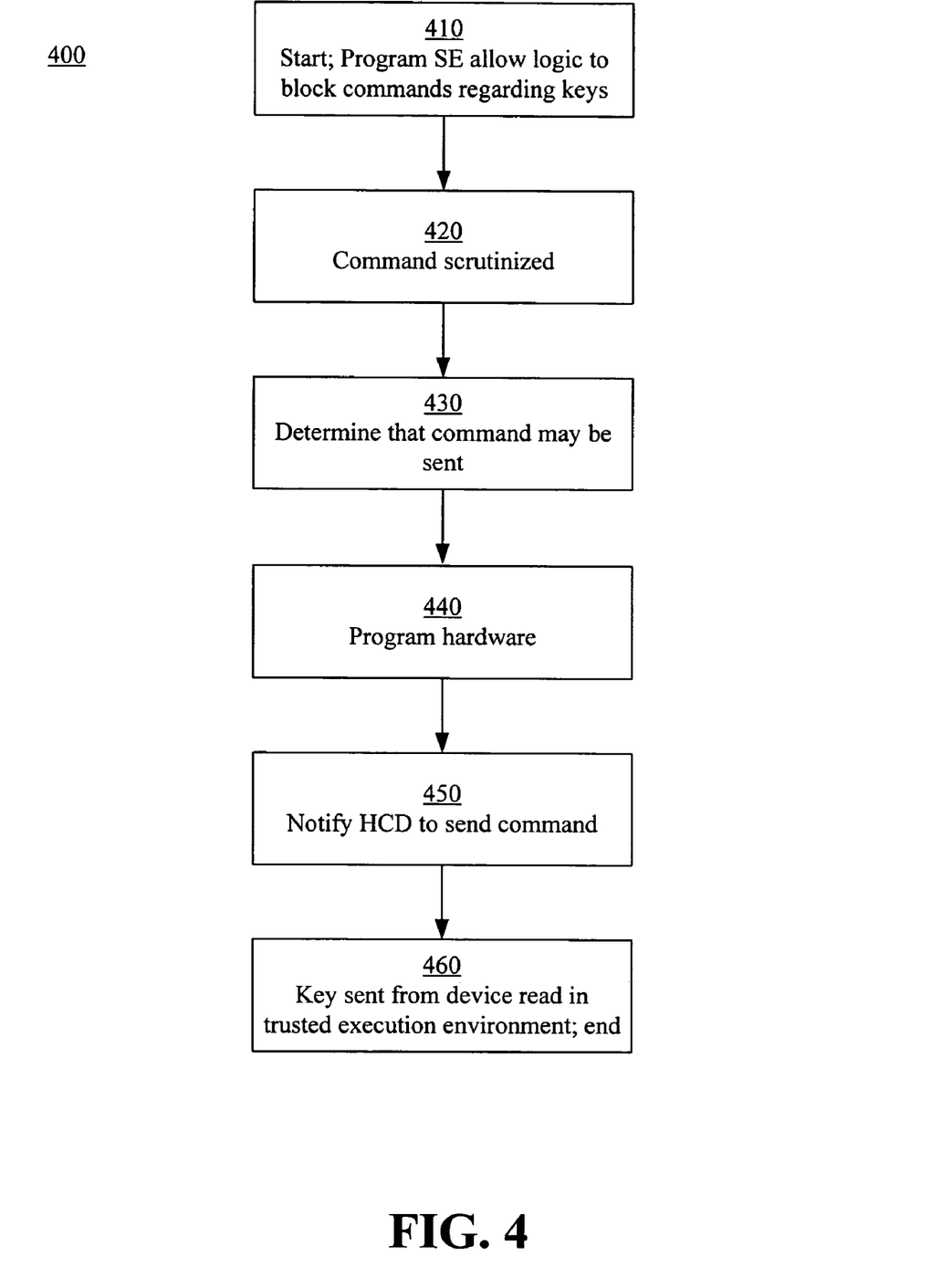
FIG. 4 is a flow diagram of an example method for controlling delivery of USB commands regarding cryptographic keys according to the invention.

FIG. 4 is a flow diagram of an example method 400 for controlling delivery of USB commands regarding cryptographic keys according to the invention. The method 400 is described with regard to using an allow policy for key exchange. At step 410, the SE allow logic 277 is programmed such that any USB command sent to a USB device from which a key should be read is blocked unless the command is specifically "allowed" by the allow policy software 240. Once the SE allow logic 277 is programmed, any USB commands sent to the device are evaluated by the allow policy software 240. At step 420, the allow policy software 240 scrutinizes the command after the USB command for fetching the key is sent to the USB device.

At step 430, the allow policy software 240 determines that the command is allowed and, it programs the SE allow logic 277 at 440 to allow the command through to the topology 280 and the applicable device. If the allow policy software 240 determines alternatively that the command may not be sent, then the hardware of the SE 265 (e.g., the SE allow logic 277) is not altered and, if malicious software attempts to send the command, the command will be blocked by the hardware. At step 450, the allow policy software 240 sends the command to the HCD 210 for delivery to the device. Additionally, the hardware is instructed to divert any data returned from the device to the SE buffer 275 and to send the USB host controller chipset 255 substitute data so that the transaction can be completed properly. At step 460, trusted software executing in the trusted execution environment 220 can access the SE buffer 275 and read the key sent through the USB host controller chipset 255 by the device. Because the data can only be read by trusted software, malicious software running on the host 200 does not have access to it.

Figure 5A:
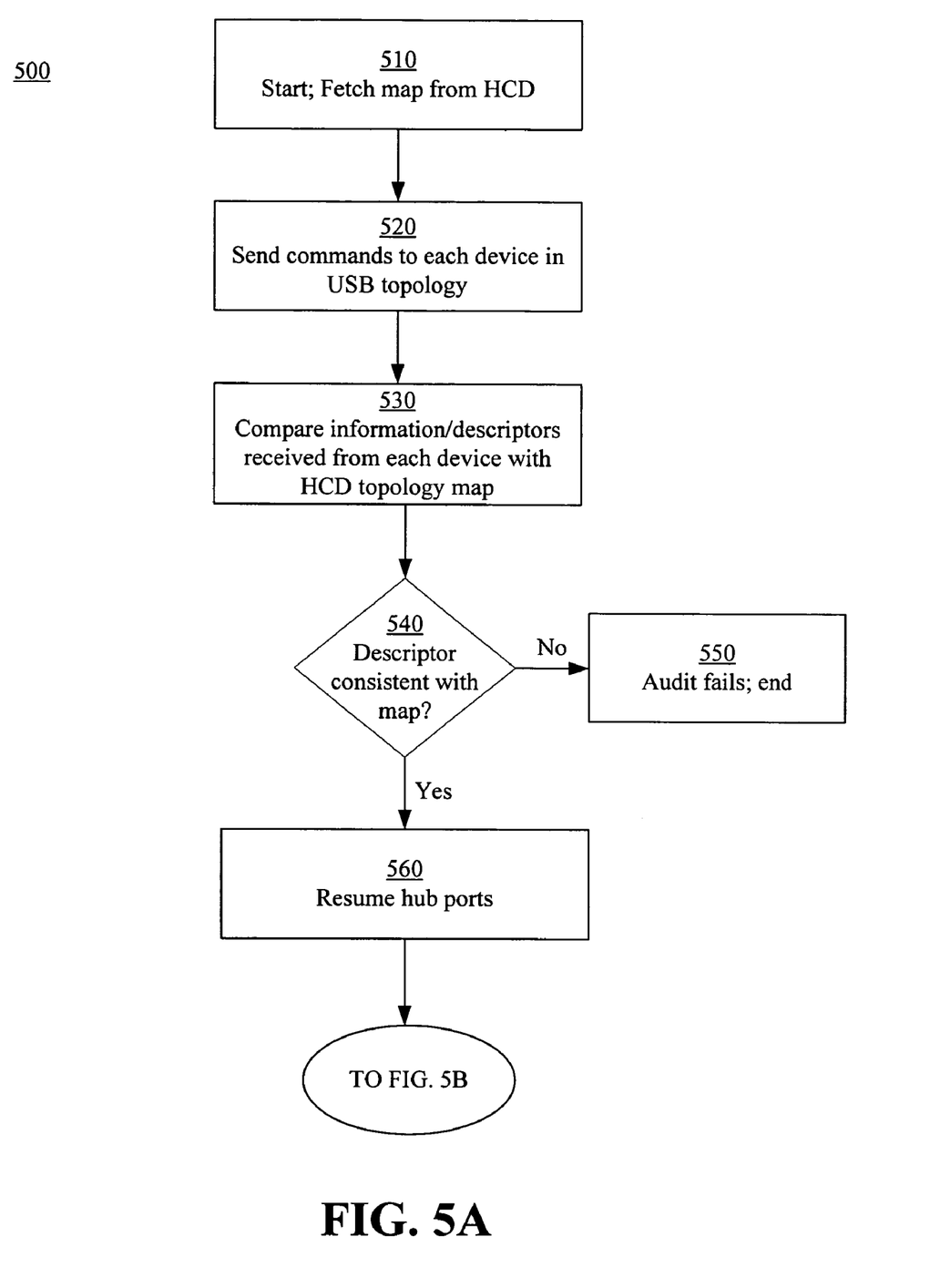
FIGS. 5A-5B depict a flow diagram of an example method for auditing a USB topology according to the invention.
Figure 5B:
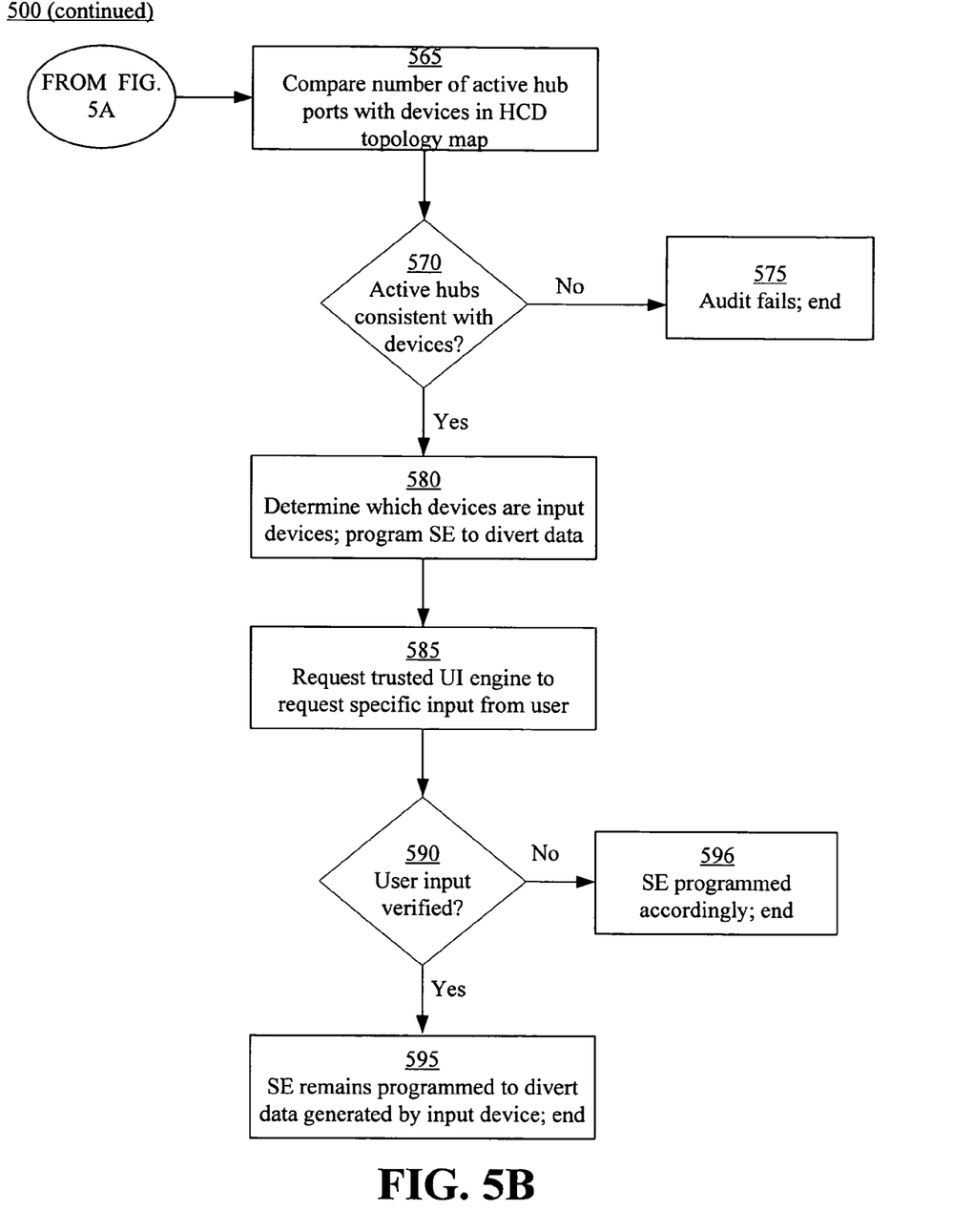

FIG. 5 is a flow diagram of an example method 500 for auditing a USB topology 280, according to the invention. The USB topology audit, whether completed through the example method 500 or other methods, verifies that the USB topology managed by the HCD 210 matches the actual USB topology 280. Because the HCD 210 is in the area outside the trusted execution environment 211, the topology map it manages may not be trustworthy. Through the method 500, the trusted audit manager 239 maintains a trusted topology map 237 with information such as to which hub a certain device is connected. In addition, the USB topology audit method 500 detects input devices, such as keyboards or mice, in the actual USB topology 280 and marks the input devices as trusted input devices after appropriate verification.

At step 510, the trusted audit manager 230 fetches the topology map managed by the HCD 210. After the trusted audit manager 230 obtains the map, it sends USB commands to all the devices in the actual USB topology 280 at step 520. The commands ensure that the type of each device matches information in the topology map fetched from the HCD 210. For example, when a USB hub is found in the actual USB topology 280, a USB command is sent to that hub to fetch certain USB descriptors. At step 530, descriptors or any other information sent by each device to the trusted audit manager 230 are scrutinized to ensure that the descriptors match the type of device indicated on the topology map. It will be understood that, to fetch the descriptors in a trustworthy fashion, the trusted audit manager 230 programs the SE 265 so that the returned descriptors are put in the SE buffer 275. Because the SE buffer 275 is only accessible to trusted software, such as the trusted audit manager 230, the descriptors are protected from malicious software running outside the trusted execution environment 220.

If at step 540, the trusted audit manager 230 determines that the descriptor for a device does not match the type of device indicated on the topology map, then at step 550, the audit fails and appropriate notifications are made. If at step 540, the trusted audit manager 230 determines that the descriptors match, then the trusted audit manager 230 next sends a command to resume all hub ports at step 560. The trusted audit manager 230 resumes suspended hub ports to ensure that the USB topology 280 has not been attacked through use of a USB device that is hidden by suspending a port on a hub to which the device is connected. At step 565, the trusted audit manager sends appropriate commands to ensure that the number of USB devices (i.e., hubs and functions) in the HCD's topology map equals the number of active hub ports in the USB topology 280. Additionally, to determine the number of active ports on the root hub of the host controller chipset 255, the trusted audit manager 230 accesses certain registers within the SE 265 registers that contain this information. If, at step 570, the number of active ports of the hubs is not equal to the number of USB devices, then the HCD's topology map does not match the actual USB topology 280. Thus, the audit fails at step 575 and appropriate actions are taken.

If the number of active ports is equal to the number of USB devices, the trusted audit manager 230 next performs steps to secure appropriate input devices. The trusted audit manager secures input devices that generate input data that the SE 265 diverts to the SE buffer 275. Because the trusted audit manager 230 can differentiate between hubs and functions in the USB topology 280, at step 580, it further examines the USB descriptors of the functions to find all the input devices. The SE 265 is programmed to divert data generated by the input devices to the SE buffer 275 for scrutiny by the trusted execution environment 220. It is understood, however, that determining devices that are, for example, keyboards or mice may not be enough, as USB devices may be maliciously programmed to look like input devices.

Therefore, the trusted audit manager 230 requests a user to actually generate data from the device in question. To examine user-provided input, at step 585, the trusted audit manager 230 asks the trusted UI engine 230 to display a trusted UI element on a display screen of the system 200. The trusted UI element requests the user to, for example, type a specific word or sequence of characters with the keyboard or to move the mouse to a certain location and clicking a mouse button. At step 590, the trusted audit manager 230 access the SE buffer 275 and examines data generated by the device to verify that the user generated the appropriate data. If the verification fails, then the device is no longer trusted and at step 596, the SE 265 is programmed so that input generated by the device is not diverted to the SE buffer 275. If the verification shows a match, then at step 595, the SE 265 remains programmed to divert data generate by the trusted device to the SE buffer 275.

Figure 6:
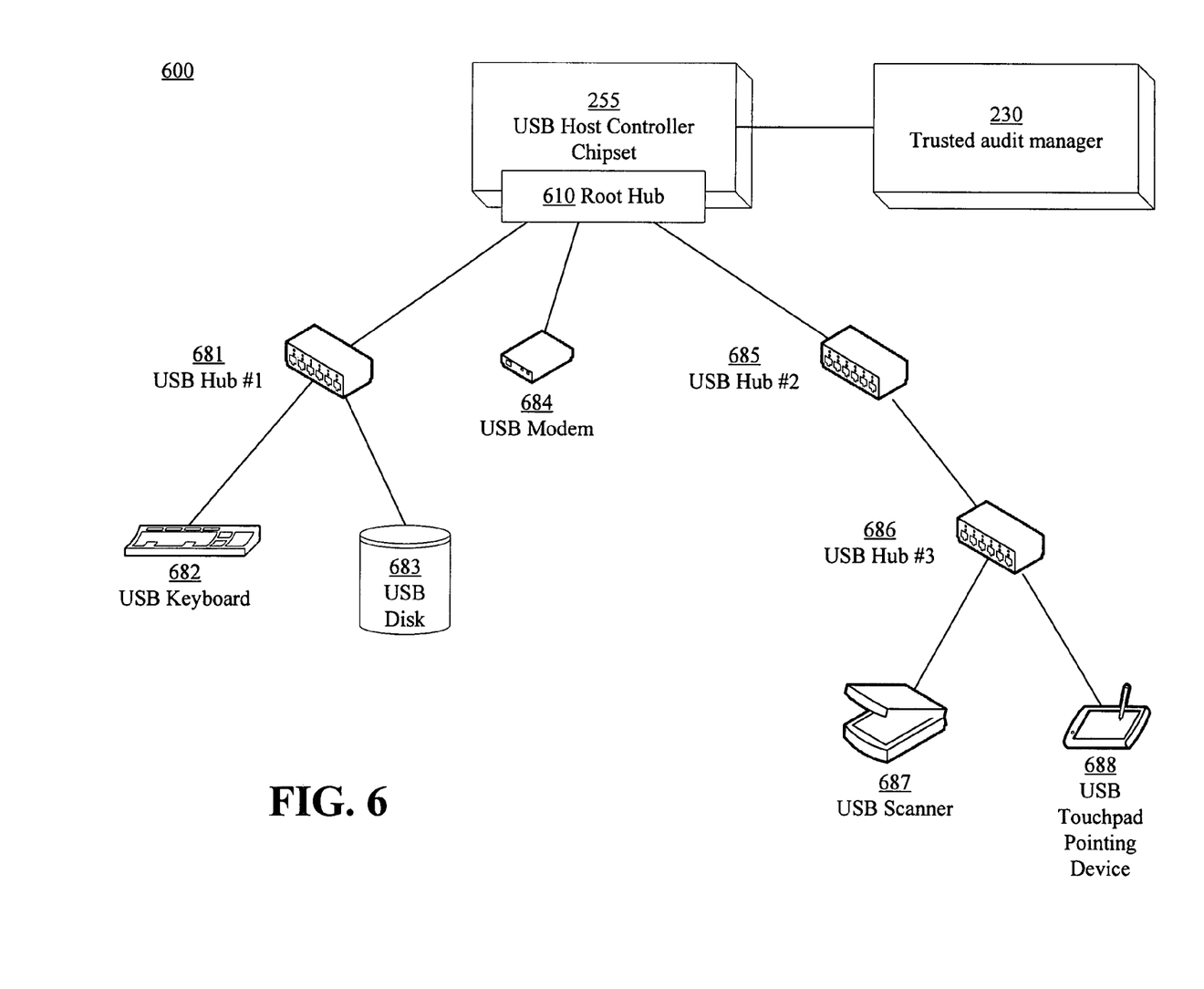
FIG. 6 is a block diagram of an example system for auditing a USB topology according to the invention.

FIG. 6 is a block diagram of an example system 600 for auditing a USB topology, according to the invention. The system 600 includes the trusted audit manager 230, USB host controller chipset 255 comprising a root hub 610, described with regard to FIG. 2, USB hubs 681, 685, 686, and USB functions 682, 683, 684, 687, 688. As described with regard to the method 500, after the trusted audit manager 230 fetches the HCD's topology map, the trusted audit manager 230 sends commands to the hubs 610, 681, 685, 686 and functions 682, 683, 684, 687, 688 based on their USB addresses to fetch descriptors. This is completed after the SE 265 is programmed to divert data returned from the USB devices to the SE buffer 275. The trusted audit manager 230 accesses the SE buffer 275 and obtains the descriptors of each device in order to make sure that the device type is correct. For example, when a Get_Descriptor command is sent to USB hub #1 681, the returned descriptor should indicate that the device is indeed a hub. The trusted audit manager 230 then resumes the ports on the hubs 681, 685, 686 to ensure no ports are suspended. This is done by sending the appropriate USB command to the hubs 681, 685, 686.

The trusted audit manager 230 counts the active ports on all the hubs 610, 681, 685, 686 in the topology. In the system 600, the trusted audit manager 230 determines that eight ports are active, the respective ports for the three hubs 681, 685, 686 and the five functions 682, 683, 684, 687, 688. Assuming that the topology map fetched from the HCD 210 contains information indicating that eight ports are active, then the audit is successful.

Finally, the trusted audit manager 230 secures the input devices, namely a keyboard 682 and a touchpad pointed device 688. The trusted audit manager 230 programs the SE 265 to divert input data from these devices 682, 688 to the SE buffer 275. The trusted UI engine 230 is asked to display a certain UI element using which the user should generate some input data using these devices 682, 688. The trusted audit manager accesses the SE buffer 275 and examines the data generated by the devices 682, 688. If the data matches what the trusted audit manager expected, then it is concluded that a user generated input using the devices 682, 688, as opposed to a malicious device generating the input. The devices 682, 688 are properly secured using the SE 265 hardware. If there is a mismatch, then it might mean that an adversary has manipulated a programmable USB device and made it look like, for example, the keyboard 682. In this case, the trusted topology audit fails and the SE 265 will not be programmed to treat these devices 682, 688 as "trusted."

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. A processor that executes program code for performing the steps of the methods of the invention, as described in FIGS. 3, 4, 5A and 5B and as claimed, constitute a computer system that embodies the present invention. In the case of program code execution on programmable computers, the computing device will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the specific examples in conjunction with the various figures, it is to be understood that other embodiments may be used or modifications and additions may be made to the described embodiments for performing the same function of the present invention without deviating therefrom. The examples are offered in explanation of the invention and are in no way intended to limit the scope of the invention as defined in the claims. In summary, in no way is the present invention limited to the examples provided and described herein. Therefore, the present invention should not be limited to any single embodiment, but rather should be construed in breadth and scope in accordance with the appended claims.

What is claimed:

1. A computer-readable storage medium having computer-executable instructions for performing steps, comprising:

receiving data for a USB device;

determining whether the data is permitted to be sent to the USB device; and sending an instruction based on the determining to an entity, wherein the data is a result of program code corresponding to the USB device being executed outside of a trusted execution environment, wherein the data is received in the trusted execution environment, and wherein the entity is outside the trusted execution environment, the computer-readable medium having computer-executable instructions for performing steps, comprising:

a USB host controller, prior to sending a command therefrom to the USB device, informing allow policy software in a hardware-based secure extension of the USB host controller of the command;

the allow policy software scrutinizing the command based on allow logic of the secure extension to decide whether to permit the command to be sent, and initially concluding based on the allow logic that the command cannot be sent to the USB device;

the allow policy software subsequently concluding that the command can be sent to the USB device based on predetermined security policy, and modifying the allow logic in accordance therewith;

the allow policy software instructing the USB host controller to send the command to the USB device; and the secure extension only permitting the sent command from the USB host controller to be delivered to the USB device in accordance with the allow logic.

2. The computer-readable storage medium of claim 1, having further computer-executable instructions for performing the step of:

determining that a security extension of a host controller is programmed to permit the data to be sent to the USB device.

3. The computer-readable storage medium of claim 1, having further computer-executable instructions for performing the step of:

programming a security extension of a host controller to permit the data to be sent to the USB device.

4. The computer-readable storage medium of claim 1, having further computer-executable instructions for performing the step of:

programming a security extension of a host controller to block the data from being sent to the USB device.

5. The computer-readable storage medium of claim 1, wherein the instruction comprises directing that the data be sent to the USB device.

6. The computer-readable storage medium of claim 1, wherein the instruction comprises directing that the data not be sent to the USB device.

7. The computer-readable storage medium of claim 1, wherein receiving the data comprises receiving the data from a USB host controller driver.

8. The computer-readable storage medium of claim 1, wherein the entity is a USB host controller driver.

9. The computer-readable storage medium of claim 1, wherein the program code is part of a device driver corresponding to the USB device.

10. The computer-readable storage medium of claim 1, wherein the data comprises a USB command.

11. The computer-readable storage medium of claim 10, wherein the USB command is a setup command.

12. A computer system, comprising:

means for receiving data associated with a USB device;

means for determining whether the data is permitted to be sent to the USB device; and means for sending an instruction based on the determining to an entity, wherein the data is a result of program code corresponding to the USB device being executed outside of a trusted execution environment, wherein the data is received in the trusted execution environment, and wherein the entity is outside the trusted execution environments, the computer system comprising a USB host controller, prior to sending a command therefrom to the USB device, informing allow policy software in a hardware-based secure extension of the USB host controller of the command, the allow policy software scrutinizing the command based on allow logic of the secure extension to decide whether to permit the command to be sent, and initially concluding based on the allow logic that the command cannot be sent to the USB device, the allow policy software subsequently concluding that the command can be sent to the USB device based on predetermined security policy, and modifying the allow logic in accordance therewith, the allow policy software instructing the USB host controller to send the command to the USB device, and the secure extension only permitting the sent command from the USB host controller to be delivered to the USB device in accordance with the allow logic.

13. The computer system of claim 12, further comprising:

means for determining that a security extension of a host controller is programmed to permit the data to be sent to the USB device.

14. The computer system of claim 12, further comprising:

means for programming a security extension of a host controller to block the data from being sent to the USB device.

15. The computer system of claim 12, wherein the instruction comprises directing that the data be sent to the USB device.

* * * * *

UNITED STATES PATENT AND TRADEMARK OFFICE
CERTIFICATE OF CORRECTION

| | | |
|---|---|---|
| PATENT NO. | : 7,761,618 B2 | |
| APPLICATION NO. | : 11/090582 | |
| DATED | : July 20, 2010 | |
| INVENTOR(S) | : Idan Avraham et al. | |

It is certified that error appears in the above-identified patent and that said Letters Patent is hereby corrected as shown below:

In column 16, line 7-8, in Claim 12, delete "environments," and insert -- environment, --, therefor.

Signed and Sealed this
Nineteenth Day of July, 2011

David J. Kappos
*Director of the United States Patent and Trademark Office*